United States Patent
Sodagar (10) Patent No.: US 11,838,602 B2
(45) Date of Patent: Dec. 5, 2023

(54) MPD CHAINING IN A LIVE CMAF/DASH PLAYER USING W3C MEDIA SOURCE AND ENCRYPTED EXTENSIONS

(71) Applicant: TENCENT AMERICA LLC, Palo Alto, CA (US)

(72) Inventor: Iraj Sodagar, Los Angeles, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 17/947,801

(22) Filed: Sep. 19, 2022

(65) Prior Publication Data
US 2023/0093237 A1  Mar. 23, 2023

Related U.S. Application Data (60) Provisional application No. 63/246,233, filed on Sep. 20, 2021.

(51) Int. Cl.
*H04N 21/81* (2011.01)
*H04N 21/266* (2011.01)
(Continued)

(52) U.S. Cl.
CPC ..... *H04N 21/812* (2013.01); *H04N 21/23406* (2013.01); *H04N 21/26613* (2013.01); *H04N 21/85403* (2013.01)

(58) Field of Classification Search
CPC .............. H04N 21/812; H04N 21/23406
See application file for complete search history.

(56) References Cited

U.S. PATENT DOCUMENTS

2003/0018966 A1* 1/2003 Cook ................. H04N 7/17318
348/E7.071
2008/0005349 A1  1/2008 Li et al.
(Continued)

FOREIGN PATENT DOCUMENTS

| CN | 110933482 A | 3/2020 |
|---|---|---|
| EP | 2819417 | * 12/2014 |
| EP | 2 819 417 B1 | 3/2020 |

OTHER PUBLICATIONS

International Search Report dated Feb. 24, 2023 issued by the International Searching Authority in Application No. PCT/US22/44080.
(Continued)

*Primary Examiner* — Michael H Hong
(74) *Attorney, Agent, or Firm* — Sughrue Mion, PLLC (57) ABSTRACT

A method and apparatus may be provided for building a linear media source extension (MSE) buffer from two or more nonlinear media sources using MPD chaining. The method may include parsing at least one obtained media presentation segment (MPD), and obtain a live MPD based on the at least one URL, the live MPD comprising one or more live media segments. The method may include appending the one or more ad media segments to a first MSE source buffer based on a first timing model and chaining the one or more live media segments to the one or more ad media segments by appending the one or more live media segments to the first buffer based on a second timing model. The one or more ad media segments may be dispatched and the one or more live media segments based on the first timing model and the second timing model.

17 Claims, 7 Drawing Sheets

(51) Int. Cl.
*H04N 21/234* (2011.01)
*H04N 21/854* (2011.01)

(56) References Cited

U.S. PATENT DOCUMENTS

| | | | | |
|---|---|---|---|---|
| 2019/0238950 | A1* | 8/2019 | Stockhammer | H04N 21/43074 |
| 2020/0275148 | A1* | 8/2020 | Stockhammer | H04N 21/2668 |
| 2021/0268375 | A1* | 9/2021 | Yousef | H04N 21/6373 |

OTHER PUBLICATIONS

Written Opinion dated Feb. 24, 2023 issued by the International Searching Authority in Application No. PCT/US22/44080.
"International Organisation For Standardardisation Organisation Internationale De Normalisation ISO/IECJTC1/SC29/WG11 Coding Of Moving Pictures And Audio", ISO/IECJTC1/SC29/WG11 MPEG2019/m52458, Brussels, BE, Jan. 2020 (287 pages total).
"Media Source ExtensionsTM", W3C Recommendation, Nov. 17, 2016 (77 pages total).
"Encrypted Media Extensions", W3C Recommendation, Sep. 18, 2017 (83 pages total).

\* cited by examiner

MPD CHAINING IN A LIVE CMAF/DASH PLAYER USING W3C MEDIA SOURCE AND ENCRYPTED EXTENSIONS

CROSS REFERENCE TO RELATED APPLICATION

The present application claims priority to provisional application U.S. 63/246,233, filed on Sep. 20, 2021, the contents of which is hereby expressly incorporated by reference, in its entirety, into the present application.

FIELD

Embodiments of the present disclosure are directed to the streaming media content, and more particularly to streaming media, ad, and live content in accordance with Moving Picture Experts Group (MPEG) dynamic adaptive streaming over hypertext transfer protocol (DASH).

BACKGROUND

MPEG DASH provides a standard for streaming media content over IP networks. In MPEG DASH, media presentation description (MPD) and events are used for delivering media timeline related events to a client. ISO/IEC 23009-1 DASH standard allows the streaming of multi-rate content. The DASH standard provides a single linear timeline where the periods are the continuation of each other in a single timeline. ISO/IEC 23009-1 also provides a tool for MPD chaining, i.e. signaling the URL of the next MPD to play in an MPD which can be used for pre-roll ad insertion.

MPEG DASH provides a standard for streaming multimedia content over IP networks. While the standard addresses linear playback of media content, the standard fails to address situations of nonlinear operation, e.g., where the media segments associated with different timelines that are independent of each other. MPD chaining and pre-roll ad insertion may be used to overcome the above-mentioned deficiencies. However, even MIPD chaining and pre-roll ad insertion fails when DASH players use W3C Media Source Extensions because it is very challenging to address such nonlinear playback with one single MSE source buffer. Furthermore, MPD chaining and pre-roll ad insertion cannot be used when W3C Encrypted Media Extensions for playback of protected live content when an ad is expected to be played before it using MPD chaining or pre-roll elements.

Therefore, a method for building a linear media source extension (MSE) buffer timeline from two or more nonlinear sources using MPD chaining is needed. Furthermore, a method for processing W3C Encrypted Media Extensions for playback of protected live content using MPD chaining is also needed.

SUMMARY

The present disclosure addresses one or more technical problems. The present disclosure provides a method, process, apparatus, and non-transitory computer-readable medium for building a linear media source extension (MSE) source buffer timeline from two or more nonlinear sources using MPD chaining. In addition, the present disclosure provides methods, processes, apparatus, and non-transitory system for implementing nonlinear playback using a single MSE source buffer. Furthermore, the present disclosure also enables the use of a single encrypted media extensions (EME) interface for playback of the ad and encrypted live content.

Embodiments of the present disclosure may provide a for building a linear media source extension (MSE) buffer from two or more nonlinear media sources using MPD chaining. The method may be executed by at least one processor, and may include parsing at least one obtained media presentation segment (MPD) comprising one or more ad media segments, and the one or more ad media segments comprising at least one universal resource locator (URL); obtaining a live MPD based on the at least one URL, the live MPD comprising one or more live media segments; appending the one or more ad media segments to a first MSE source buffer based on a first timing model; chaining the one or more live media segments to the one or more ad media segments by appending the one or more live media segments to the first MSE source buffer based on a second timing model, wherein the second timing model supports time shift buffer depth for at least the one or more live media segments; and dispatching the one or more ad media segments and the one or more live media segments based on the first timing model and the second timing model.

Embodiments of the present disclosure may provide an apparatus for building a linear media source extension (MSE) buffer from two or more nonlinear media sources using MPD chaining. The apparatus may include at least one memory configured to store computer program code; at least one processor configured to access the computer program code and operate as instructed by the computer program code. The program code may include parsing code configured to cause the at least one processor to parse at least one obtained media presentation segment (MPD) comprising one or more ad media segments, and the one or more ad media segments comprising at least one universal resource locator (URL); first obtaining code configured to cause the at least one processor to obtain a live MPD based on the at least one URL, the live MPD comprising one or more live media segments; first appending code configured to cause the at least one processor to append the one or more ad media segments to a first MSE source buffer based on a first timing model; second appending code configured to cause the at least one processor to chain the one or more live media segments to the one or more ad media segments by appending the one or more live media segments to the first MSE source buffer based on a second timing model, wherein the second timing model supports time shift buffer depth for at least the one or more live media segments; and dispatching code configured to cause the at least one processor to dispatch the one or more ad media segments and the one or more live media segments based on the first timing model and the second timing model.

Embodiments of the present disclosure may provide a non-transitory computer-readable medium storing instructions. The instructions may include one or more instructions that, when executed by one or more processors of a device for building a linear media source extension (MSE) buffer from two or more nonlinear media sources using MPD chaining, cause the one or more processors to parse at least one obtained media presentation segment (MPD) comprising one or more ad media segments, and the one or more ad media segments comprising at least one universal resource locator (URL); obtain a live MPD based on the at least one URL, the live MPD comprising one or more live media segments; append the one or more ad media segments to a first MSE source buffer based on a first timing model; chain the one or more live media segments to the one or more ad media segments by appending the one or more live media segments to the first MSE source buffer based on a second timing model, wherein the second timing model supports time shift buffer depth for at least the one or more live media segments; and dispatch the one or more ad media segments and the one or more live media segments based on the first timing model and the second timing model.

BRIEF DESCRIPTION OF THE DRAWINGS

Further features, nature, and various advantages of the disclosed subject matter will be more apparent from the following detailed description and the accompanying drawings in which.

DETAILED DESCRIPTION

The proposed features discussed below may be used separately or combined in any order. Further, the embodiments may be implemented by processing circuitry (e.g., one or more processors or one or more integrated circuits). In one example, the one or more processors execute a program that is stored in a non-transitory computer-readable medium.

Figure 1:
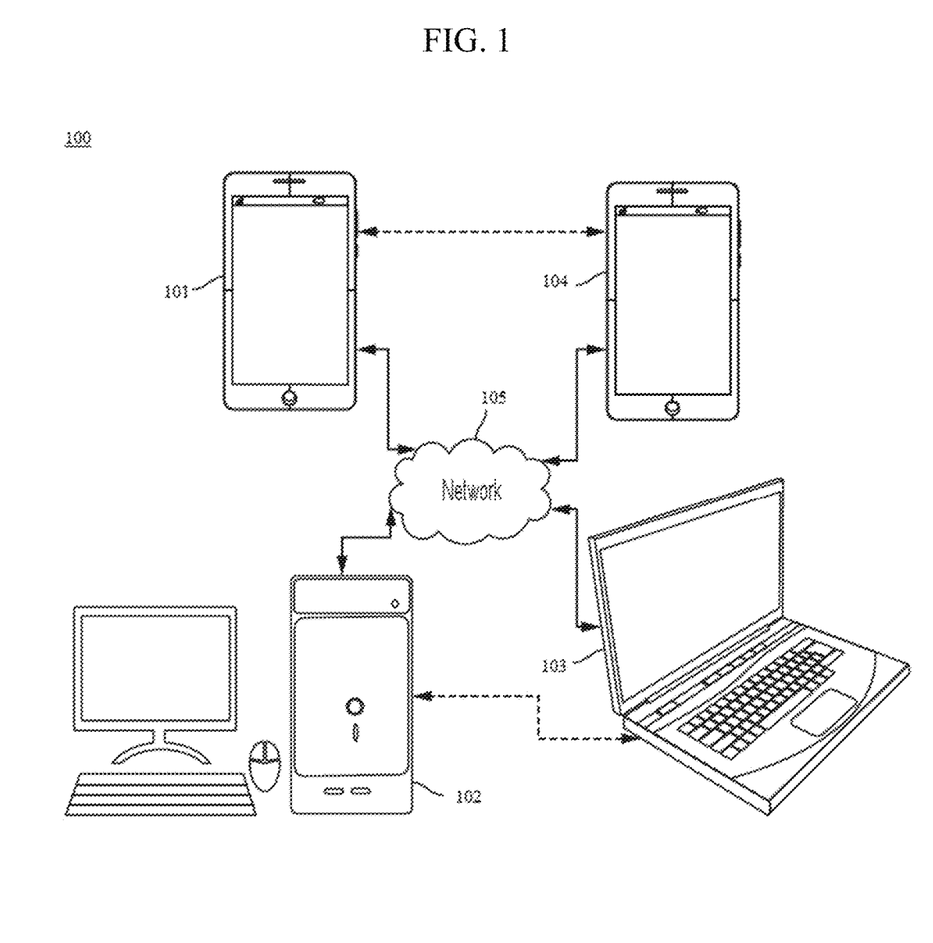
FIG. 1 is a simplified illustration of a communication system, in accordance with embodiments.

FIG. 1 illustrates a simplified block diagram of a communication system 100 according to an embodiment of the present disclosure. The communication system 100 may include at least two terminals 102 and 103 interconnected via a network 105. For unidirectional transmission of data, a first terminal 103 may code video data at a local location for transmission to the other terminal 102 via the network 105. The second terminal 102 may receive the coded video data of the other terminal from the network 105, decode the coded data and display the recovered video data. Unidirectional data transmission may be common in media serving applications and the like.

FIG. 1 illustrates a second pair of terminals 101 and 104 provided to support bidirectional transmission of coded video that may occur, for example, during videoconferencing. For bidirectional transmission of data, each terminal 101 and 104 may code video data captured at a local location for transmission to the other terminal via the network 105. Each terminal 101 and 104 also may receive the coded video data transmitted by the other terminal, may decode the coded data and may display the recovered video data at a local display device.

In FIG. 1, the terminals 101, 102, 103 and 104 may be illustrated as servers, personal computers and smart phones but the principles of the present disclosure are not so limited. Embodiments of the present disclosure find application with laptop computers, tablet computers, media players and/or dedicated video conferencing equipment. The network 105 represents any number of networks that convey coded video data among the terminals 101, 102, 103 and 104, including for example wireline and/or wireless communication networks. The communication network 105 may exchange data in circuit-switched and/or packet-switched channels. Representative networks include telecommunications networks, local area networks, wide area networks and/or the Internet. For the purposes of the present discussion, the architecture and topology of the network 105 may be immaterial to the operation of the present disclosure unless explained herein below.

Figure 2:
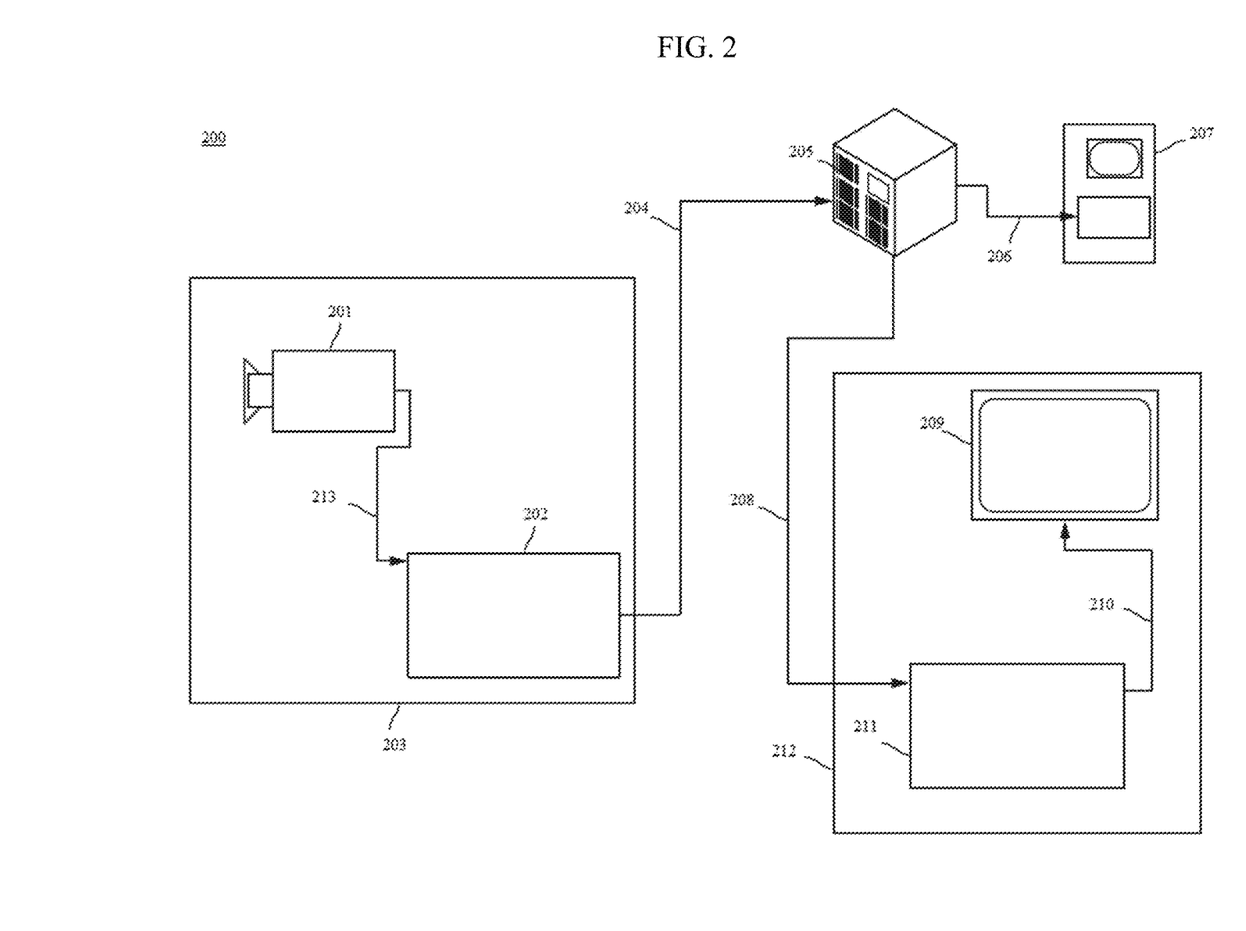
FIG. 2 is an example illustration of placements of components in a streaming environment, in accordance with embodiments.

FIG. 2 illustrates, as an example, the placement of a video encoder and decoder in a streaming environment. Embodiments may be applicable to other video enabled applications, including, for example, video conferencing, digital TV, storing of compressed video on digital media including CD, DVD, memory stick and the like, and so on.

A streaming system may include a capture subsystem 203 that can include a video source 201, for example a digital camera, creating, for example, an uncompressed video sample stream 213. That sample stream 213 may be emphasized as a high data volume when compared to encoded video bitstreams and can be processed by an encoder 202 coupled to the video source 201. The encoder 202 can include hardware, software, or a combination thereof to enable or implement aspects of embodiments as described in more detail below. The encoded video bitstream 204, which may be emphasized as a lower data volume when compared to the sample stream, can be stored on a streaming server 205 for future use. One or more streaming clients 212 and 207 can access the streaming server 205 to retrieve encoded video bitstream 208 and 206 which may be copies of the encoded video bitstream 204. A client 212 can include a video decoder 211 which decodes the incoming copy of the encoded video bitstream 208 and creates an outgoing video sample stream 210 that can be rendered on a display 209 or other rendering device. In some streaming systems, the encoded video bitstreams 204, 206 and 208 can be encoded according to certain video coding/compression standards. Examples of those standards are noted above and described further herein.

Figure 3:
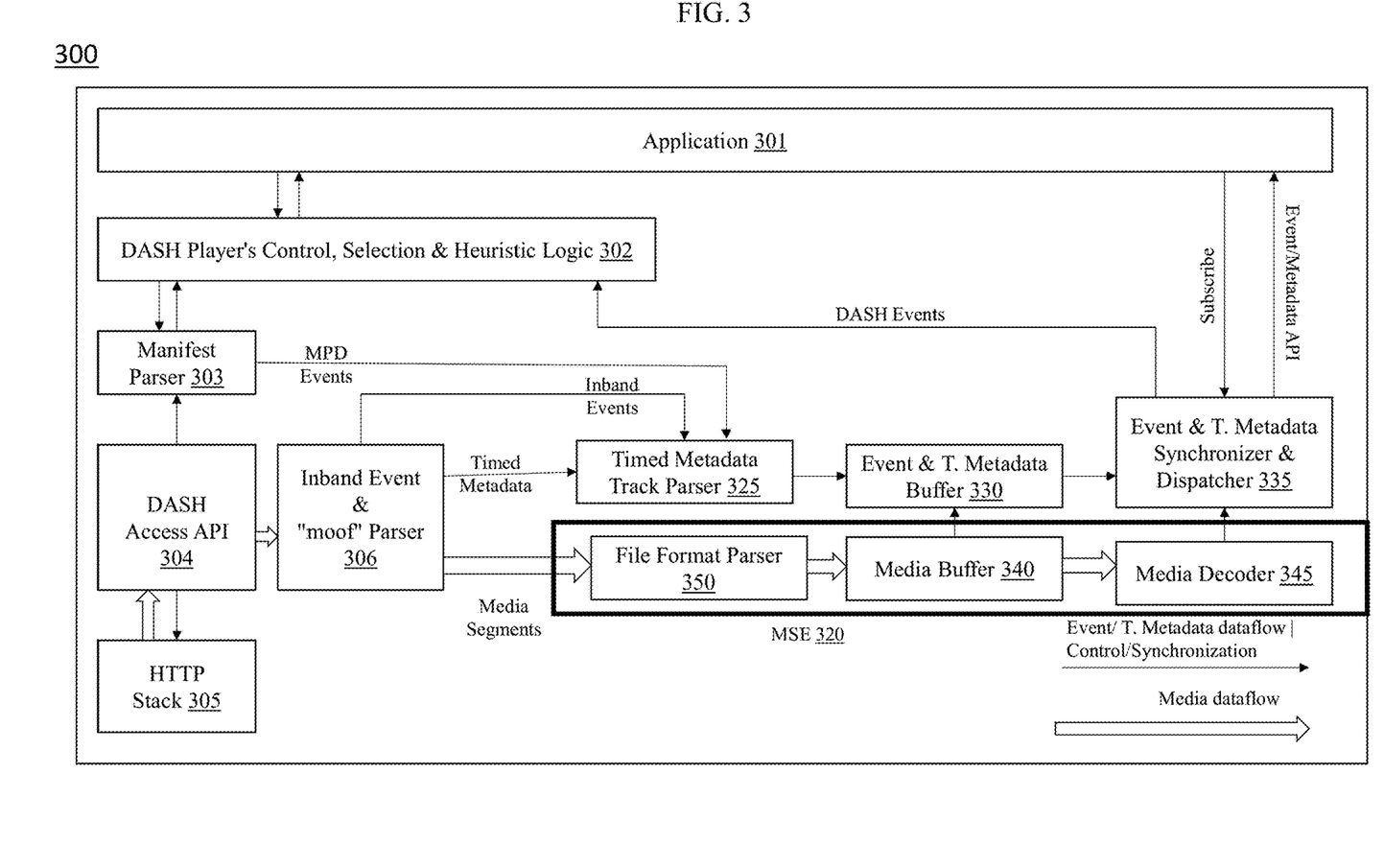
FIG. 3 is a simplified block diagram of a DASH processing model, in accordance with embodiments.

FIG. 3 shows a sample DASH processing model 300, such as of a sample client architecture for processing DASH and CMAF events. In the DASH processing model 300, a client's request of media segments (e.g., ad media segments and live media segments) may be based on described addresses in a manifest 303. The manifest 303 also describes metadata tracks from which a client may access segments of metadata tracks, parse them, and send them to an application 301.

The manifest 303 includes MPD events or events, and an inband event and 'moof' parser 306 may parse MPD event segments or event segments and append the event segments to an event and metadata buffer 330. The inband event and 'moof' parser 306 may also fetch and append the media segments to a media buffer 340. The event and metadata buffer 330 may send event and metadata information to an event and metadata synchronizer and dispatcher 335. The event and metadata synchronizer and dispatcher 335 may dispatch specific events to DASH players control, selection, and heuristic logic 302 and application related events and metadata tracks to application 301.

According to some embodiments, a MSE may include a pipeline including a file format parser 350, the media buffer 340, and a media decoder 345. MSE 320 is a logical buffer(s) of media segments, where the media segments may be tracked and ordered based on the media segments' presentation time. Media segments may include but may not be limited to ad media segments associated with ad MPDs and live media segments associated with live MPDs. Each media segment may be added or appended to the media buffer 340 based on the media segments' timestamp offset, and the timestamp offset may be used to order the media segments in the media buffer 340.

Since embodiments of the present application may be directed to building a linear media source extension (MSE) buffer from two or more nonlinear media sources using MPD chaining, and the nonlinear media sources may be ad MPDs and live MPDs, the file format parser 350 may be used to process the different media and/or codecs used by the live media segments included in the live MPDs. In some embodiments, the file format parser may issue a change type based on a codec, profile, and/or level of the live media segments.

As long as media segments exist in the media buffer 340, the event and metadata buffer 330 maintains corresponding event segments and metadata. The sample DASH processing model 300 may include a timed metadata track parser 325 to keep track of the metadata associated with the inband and MPD events. According to FIG. 3, the MSE 320 includes only the file format parser 350, the media buffer 340, and the media decoder 345. The event and metadata buffer 330 and event and metadata synchronizer and dispatcher 335 are not native to the MSE 320, inhibiting the MSE 320 from natively processing events and sending them to the application.

Figure 4:
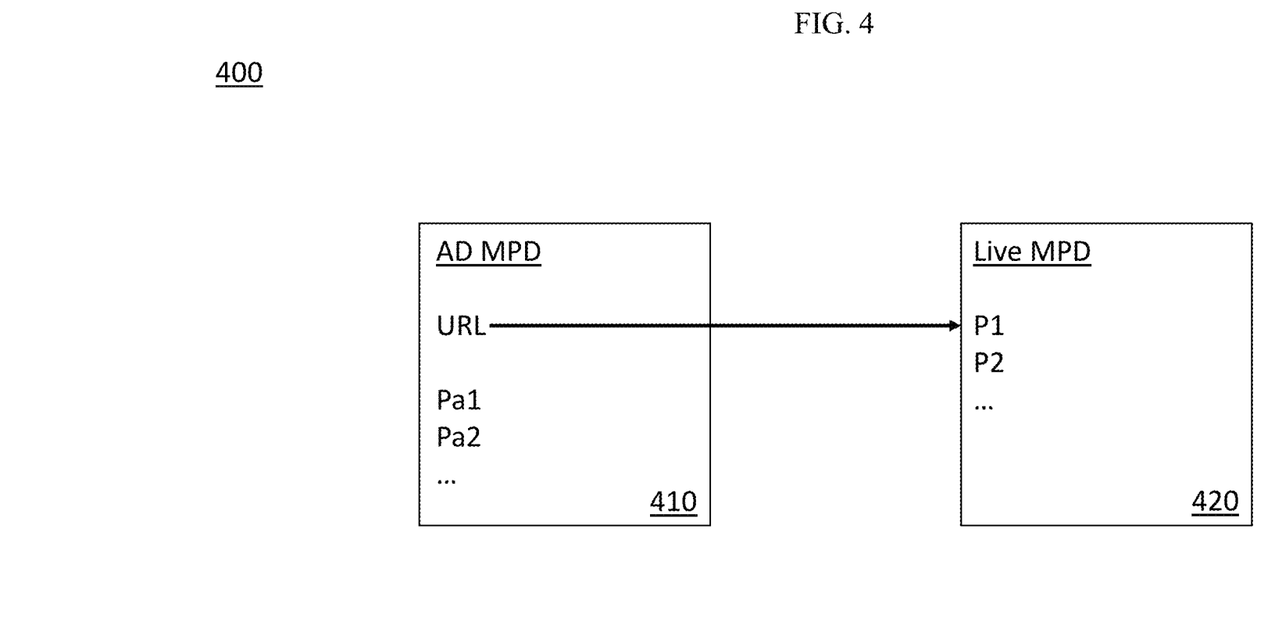
FIG. 4 is a simplified illustration of media presentation description (MPD) chaining among ad MPD and live MPD, in accordance with embodiments.

FIG. 4 is a simplified a diagram 400 illustrating MPD chaining between Ad MPD and Live MPD.

As shown in FIG. 4, the ad MPD 410 may include one or more universal resource locators (URLs) containing an address to at least one live MPD 420. According to an aspect of the embodiments, the URL linking between the ad MPD 410 and the live MPD 420 may be MPD chaining. Each ad MPD 410 may contain one or more periods Pa1, Pa2, etc. Similarly, each line MPD 420 may include one or more periods P1, P2, etc. According to an aspect of the present disclosure, the media player may play the ad MPD 410 prior to the live MPD 420.

According to an aspect of the present disclosure, one or more timing models may be provided for the DASH player for setting up a single media source extension (MSE) buffer from two or more nonlinear media sources for media playback using MPD chaining. The MSE buffer may be set up to support a required timeshift buffer depth. Re-initialization segments may be added to the MSE buffer to play both ad media and live media with different codes, profiles, and/or levels. In some embodiments, ad media segments may be maintained in the timeshift buffer to enable the DASH player to seek back to the ad, or replace the ad media segment with live media segments to enable the DASH player to seek to the true live timeshift buffer.

One or more MPDs may be obtained from video data. The one or more MPDs may be parsed to generate and/or retrieve one or more ad media segments. In some embodiments, the one or more ad media segments may include at least one universal resource locator (URL) associated with one or more live media segments. Ad media segments (also referred to as "on-demand content") may be available before playback. The ad media segments may not have a known duration but may at least have a maximum duration—$D_{MAX}$. A presentation time offset associated with the one or more ad media segments may be known as $PTO_P$ with timescale $T_P$.

Live content may include one or more live MPDs. The one or more live MPDs may comprise one or more live media segments. The start time of the live content and current period start time of the live content may be known. A presentation time offset associated with the one or more live media segments may be known as $PTO_L$ with timescale $T_L$. A segment address for starting the live content with an estimated earliest presentation time ($EEPT_L$) of that segment may not be known. A maximum segment duration associated with the one or more live media segments may be known as MSD, and a desired time shift buffer depth for the live content may be known as $TSB_L$.

According to embodiments of the present disclosure, since the ad MPD may not have any information regarding the live MPD, and therefore, for setting up the MSE buffer, the DASH client may need to download the live MPD before setting up the MSE Buffer.

According to the above-mentioned embodiment, the DASH player (e.g., 300) may download the one more ad MPDs and parse it. The file format parser may find and/or retrieve the required codecs in the ad MPD. Using the URL in the ad media segment from the ad MPD, the live MPD may be downloaded, and the live edge and the corresponding period of the live media MPD may be found. The file format parser may find/retrieve the required codecs in the live MPD. The MSE buffer may be set up based the codec information in both ad MPD and live MPD (or ad media segments and live media segments). Ad media segments may be downloaded from the ad MPD and appended to the MSE buffer using the timing models, e.g., timing models in FIGS. 5A-B. Subsequent to appending the ad media segments, the live media segments may be downloaded or appended to the MSE buffer sing the timing models, e.g., timing models in FIGS. 5A-B.

Figure 5A:
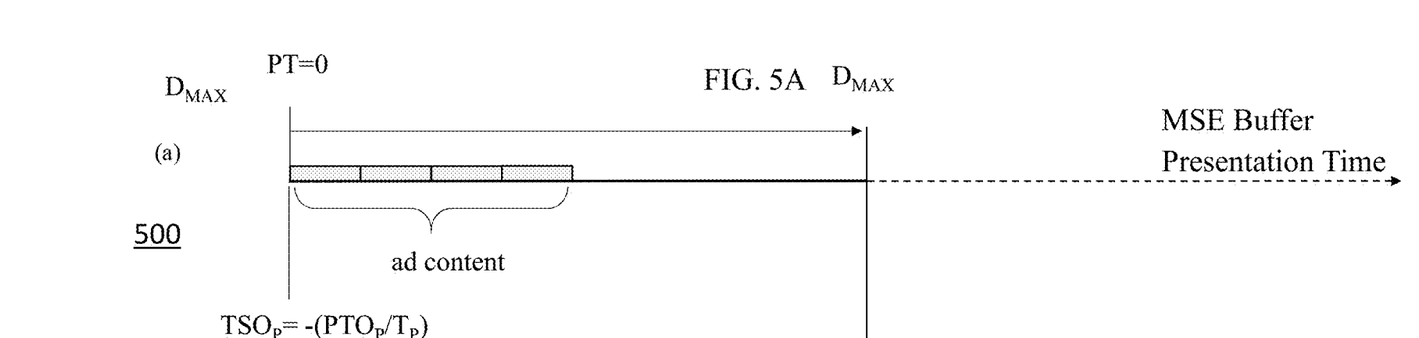
FIG. 5A-B are simplified diagrams of a media source extension (MSE) buffer, in accordance with embodiments.
Figure 5B:
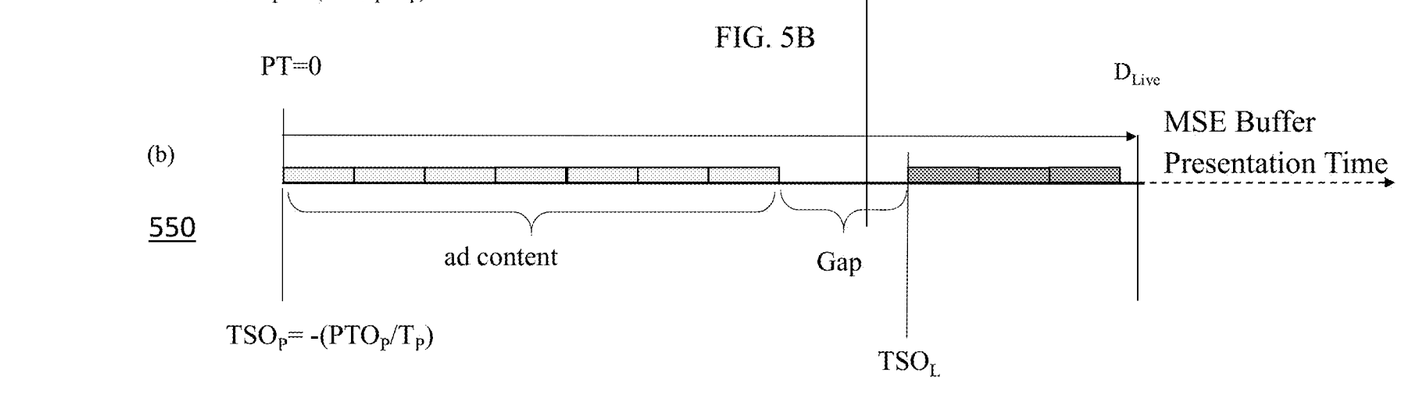

FIG. 5A-B show exemplary media source buffer 500 and media source buffer 550 for processing ad media segments and live media segments using MPD chaining.

As shown in FIG. 5A, an MSE append window may be defined with a size equal to or more than the maximum ad duration (e.g., $D_{MAX}$) or more. The MSE append window timestamp offset may be set as $TSO_P=-(PTO_P/T_P)$ while appending ad segments.

As shown in FIG. 5B, the MSE append window may be resized to $D_{Live}$ considering the live MPD time shift buffer ($TSB_L$) by the DASH client. In some embodiments, $D_{Live}$ Max($TSB_L$, $D_{MAX}$) or more. The MSE append window timestamp offset may be reset as $TSO_L$, wherein $TSO_L$ may be equal to Max($TSB_L$, $D_{MAX}$)+$EEPT_L$+MSD−($PTO_L/T_L$) prior to appending the first live segment. Based on the appending and timestamp offset, there may be seeking on the MSE buffer between the ad media segment time and the live media segment time. Based on a last frame of an ad media segment being played prior to a live media segment, there may be seeking to the start of the live media segment. The ad media segment time range may be purged if the ad media segment is expected to be played once. In embodiments where the ad media segment may be played after the player seeks to the time shifted live media segment, a third time range may be created for time-shifted live media segment.

Ad Played Once and Removed

MSE Set-up: Check if the MSE may support the ad video codec and profile; create a MSE buffer; and the MSE buffer append window duration may be set up to $D_{MAX}$.

Playback: The MSE timestamp official may be set based on TSO=−($PTO_P/T_P$); the first ad media segment may be retrieved and appended to the MSE buffer; each of the ad media segments in the ad MPD may be appended to the MSE buffer. Subsequent to each media segment being downloaded, the MSE append window may be extended to duration $D_{LIVE}$, and the time stamp offset may be $TSO_L=Max(TSB_L, D_{MAX})+EPT+MSD-(PTO_L/T_L)$. The first live media segment may be appended to the MSE buffer, and each live media segment from the live MPD may also be appended. Based on reaching the end of the ad media segment, seek to the starting time of the live media segment.

Timeshift Buffer: range from the start to the end of the ad media segment may be removed.

Ad Played Once But Stays Mid-Roll

MSE Set Up: Check if the MSE may support the ad video codec and profile; create a MSE buffer; and the MSE buffer append window duration may be set up to $TSB_{Max}=D_{MAX}+$ upper estimate of $TSBD_L$. The start of the append window may be set to zero and the end of the append window may be set to $TSB_{Max}+D_{Live}$. In some embodiments, if the duration of the live program is not known, the append window end may be a large value or infinity.

Playback: The MSE time stamp offset may be set to $TSO=TSB_{Max}-D_{MAX}-(PTO_P/T_P)$. The first ad media segment may be retrieved and appended to the MSE buffer; each of the ad media segments in the ad MPD may be appended to the MSE buffer. A change type may be issued regarding the codecs, profiles, and/or levels of the live media segments. The time stamp offset may be set to $TSO_L=Max(TSB_L, D_{MAX})+EPT+MSD-(PTO_L/T_L)$. The first live media segment may be appended to the MSE buffer, and each live media segment from the live MPD may also be appended. Based on reaching the end of the ad media segment, seek to the starting time of the live media segment. Then the first ad media segment may be retrieved again and appended to the MSE.

Timeshift Buffer Management: The time stamp offset for the time shift buffer may be set as $TSO=TSB_{Max}-D_{Max}-(PTO_P/T_P)-(PTO_L/T_L)$. Based on an ad media segment being played again, the one or more ad media segments may be retrieved and appended to the time shift buffer. Each ad media segment may be appended to the time shift buffer.

W3C Encrypted Media Extension (EME) Interface

The W3C EME interface may be used for the decryption of the encrypted data in the media playback. The ad content may usually not be protected. However, the live content may be protected. When live content is protected, the player may need to download the ad MPD, and using the URL in that ad MPD, download the live MPD. Using the information in the live MPD, the player may set up the EME and MSE pipelines. The EME pipeline set-up may include getting the license keys from the license servers. Then, the player may start downloading the ad segments using the ad MPD and append them into the media pipeline.

In some embodiments, since the ad MPD may not have information about the live MPD, the MSE and EME may be sequentially set-up. The player may download the ad MPD. Using the URL in the ad MPD, the player may download and parse the live MPD. Given the parameters of the live MPD, the player may set up the MSE and the EME buffers. Then, the player may download the subsequent ad MPD and start downloading the corresponding segments and appending them to the media pipeline.

In some embodiments, the ad MPD may have information about the live MPD, the MSE and EME may be set-up in parallel. The player may download the ad MPD, then based on parsing the ad MPD, the player may its periods in its internal memory. Using the URL in the ad MPD, the player may download and parse the live MPD and store its periods in its internal memory. Given the parameters of the ad and live MPD, the player may set-up the MSE and the EME buffers. Then the ad segments from the ad periods may be downloaded and appended to the media pipeline.

Figure 6:
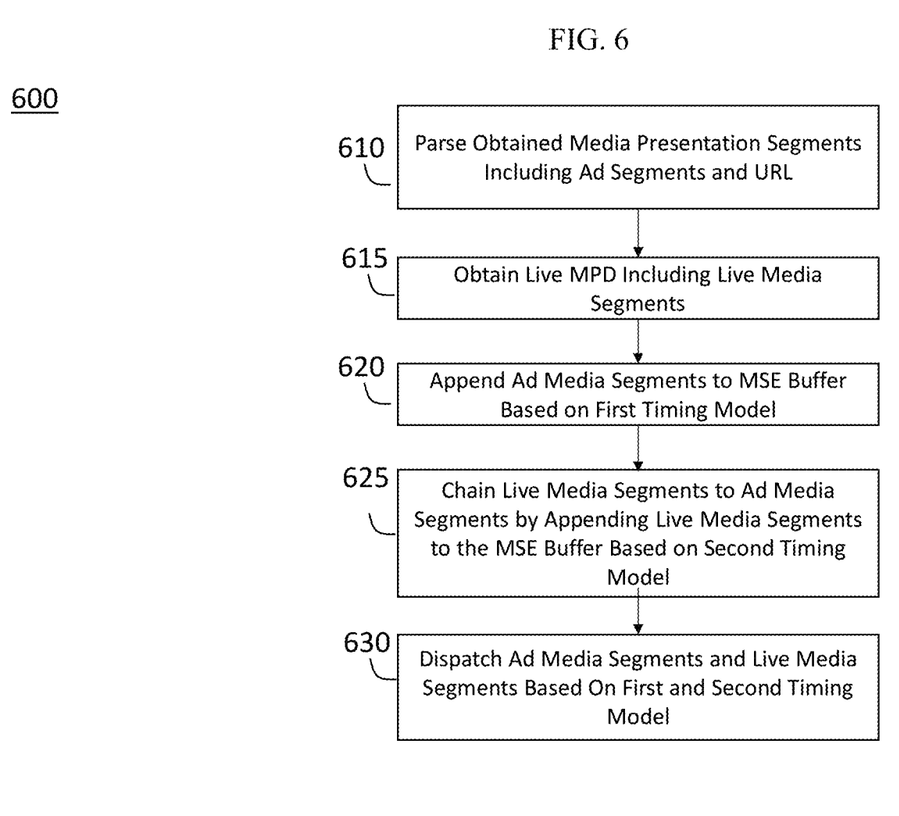
FIG. 6 is an exemplary flowchart illustration for building a linear MSE source buffer from two or more nonlinear sources using MPD chaining, in accordance with embodiments.

FIG. 6 shows an exemplary flowchart illustrating a process 600 for building a linear media source extension (MSE) buffer from two or more nonlinear media sources using MPD chaining.

At operation 610, at least one obtained media presentation segment (MPD) including one or more ad media segments may be parsed. The one or more ad media segments may include at least one universal resource locator (URL). As an example, the manifest parser 303, inband event and moof parser 306 may parse the obtained MPD. The operation may include retrieving one or more codes associated with the at least one obtained MPD and the live MPD At operation 615, a live MPD may be obtained based on the at least one URL, the live MPD comprising one or more live media segments. As an example, live MPD 420 may be obtained based on parsing a URL in an ad MPD 410.

At operation 620, the one or more ad media segments may be appended to a first buffer based on a first timing model. In some embodiments, the first buffer may be extended to a first maximum duration based on the at least one obtained MPD. As an example, the MSE buffer may be extended to $D_{MAX}$. A timestamp offset of the first buffer may also be set based on a first presentation time offset associated with the one or more ad media segments. As an example, the first presentation time offset may include $TSO=TSB_{Max}-D_{MAX}-(PTO_P/T_P)$. In some embodiments, the first presentation time offset may include $TSO=-(PTO_P/T_P)$.

At operation 625, the one or more live media segments may be chained to the one or more ad media segments by appending the one or more live media segments to the first buffer based on a second timing model. In some embodiments, the live media segments may be appended only subsequent to each ad media segment has been added. Appending based on the second timing model may include extending the first buffer to a second maximum duration based on the one or more live media segments. The timestamp offset of the first buffer based on a second presentation time offset associated with the one or more live media segments may be reset. As an example, the MSE may be extended to $TSO_L=Max(TSB_L,D_{MAX})+EPT+MSD-(PTO_L/T_L)$.

The first live media segment may be appended to the first buffer among the one or more live media segments. According to embodiments, the second presentation time offset is based on an estimated earliest presentation time associated with the one or more live media segments and a maximum segment duration associated with the one or more live media segments.

The player may seek to a start of the one or more live media segments appended in the first buffer based on a last frame of the one or more ad media segments being played.

At operation 630, the one or more ad media segments and the one or more live media segments may be dispatched based on the first timing model and the second timing model. In some embodiments, a first ad media segment may be purged among the one or more ad media segments from the first buffer based on the first ad media segment being configured to be played once. In other embodiments, the first ad media segment among the one or more ad media segments may be appended to a third buffer (e.g., timestamp buffer) based on the first ad media segment being configured to be played more than once, and the first live media segment among the one or more live media segments may be appended prior to the first ad media segment based on the first ad media segment being a midroll ad during the first live media segment.

In some embodiments, based on the one or more live media segments being encrypted, one or more license keys may be retrieved from a license server, and the one or more license keys may be stored and/or appended in a second buffer.

Although FIG. 6 shows example blocks of the processes 600, in embodiments, the processes 600 may include additional blocks, fewer blocks, different blocks, or differently arranged blocks than those depicted in FIG. 6. In embodiments, any blocks of processes 600 may be combined or arranged in any amount or order, as desired. In embodiments, two or more of the blocks of the processes 600 may be performed in parallel.

The techniques described above, can be implemented as computer software using computer-readable instructions and physically stored in one or more computer-readable media or by a specifically configured one or more hardware processors. For example, FIG. 7 shows a computer system 700 suitable for implementing various embodiments.

The computer software can be coded using any suitable machine code or computer language, that may be subject to assembly, compilation, linking, or like mechanisms to create code comprising instructions that can be executed directly, or through interpretation, micro-code execution, and the like, by computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 7:
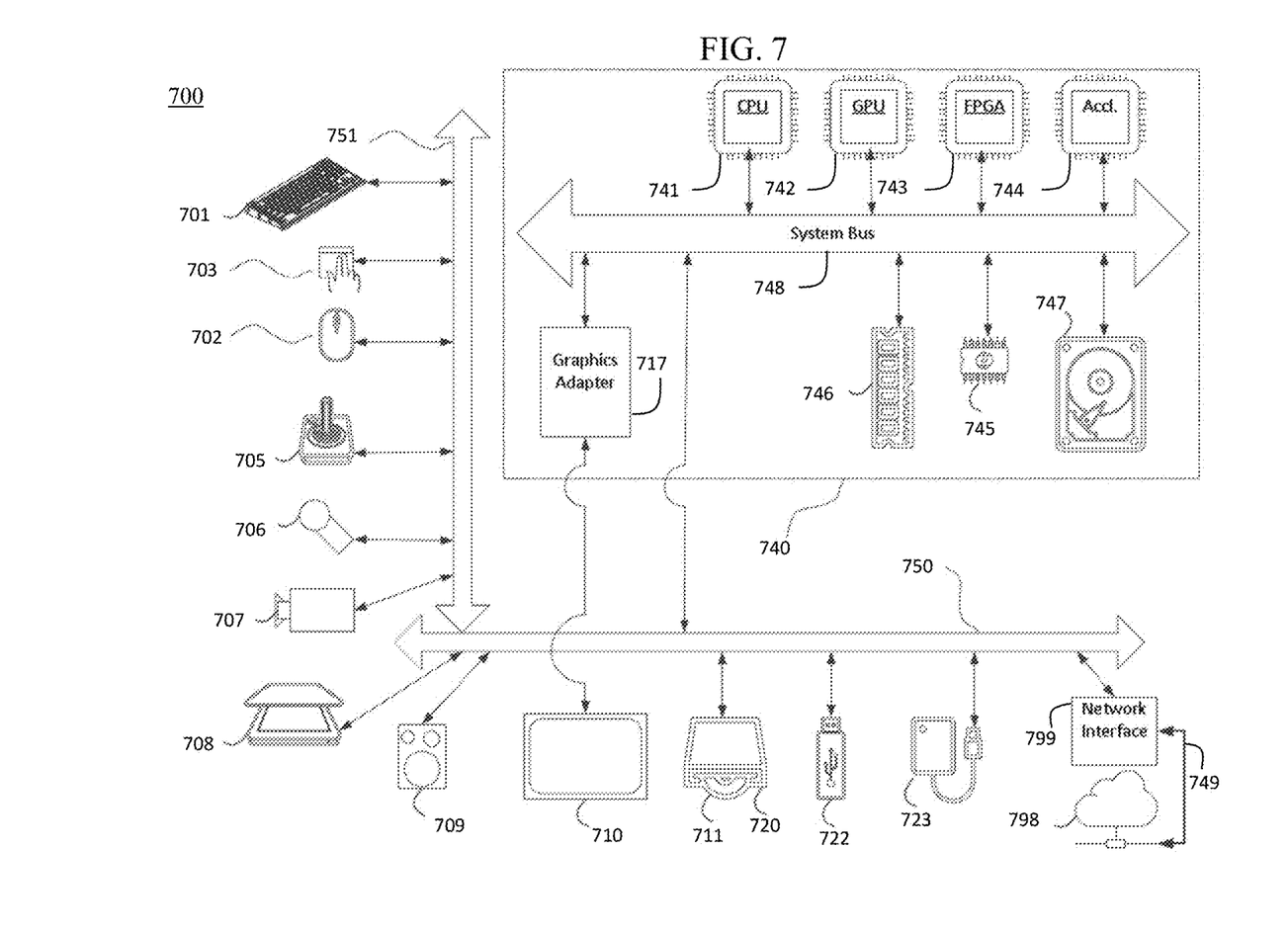
FIG. 7 is a simplified diagram of a computer system, in accordance with embodiments.

The components shown in FIG. 7 for computer system 700 are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system 700.

Computer system 700 may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input. The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each is depicted in the Figures): keyboard 701, mouse 702, trackpad 703, touch screen 710, joystick 705, microphone 706, scanner 708, camera 707.

Computer system 700 may also include certain human interface output devices. Such human interface output devices may be stimulating the senses of one or more human users through, for example, tactile output, sound, light, and smell/taste. Such human interface output devices may include tactile output devices (for example tactile feedback by the touch screen 710, or joystick 705, but there can also be tactile feedback devices that do not serve as input devices), audio output devices (such as: speakers 709, headphones), visual output devices (such as screens 710 to include CRT screens, LCD screens, plasma screens, OLED screens, each with or without touch-screen input capability, each with or without tactile feedback capability-some of which may be capable to output two dimensional visual output or more than three dimensional output through means such as stereographic output; virtual-reality glasses, holographic displays and smoke tanks), and printers.

Computer system 700 can also include human accessible storage devices and their associated media such as optical media including CD/DVD ROM/RW 720 with CD/DVD 711 or the like media, thumb-drive 722, removable hard drive or solid state drive 723, legacy magnetic media such as tape and floppy disc, specialized ROM/ASIC/PLD based devices such as security dongles, and the like.

Those skilled in the art should also understand that term "computer readable media" as used in connection with the presently disclosed subject matter does not encompass transmission media, carrier waves, or other transitory signals.

Computer system 700 can also include interface 799 to one or more communication networks 798. Networks 798 can for example be wireless, wireline, optical. Networks 798 can further be local, wide-area, metropolitan, vehicular and industrial, real-time, delay-tolerant, and so on. Examples of networks 798 include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks 798 commonly require external network interface adapters that attached to certain general-purpose data ports or peripheral buses (750 and 751) (such as, for example USB ports of the computer system 700; others are commonly integrated into the core of the computer system 700 by attachment to a system bus as described below (for example Ethernet interface into a PC computer system or cellular network interface into a smartphone computer system). Using any of these networks 798, computer system 700 can communicate with other entities. Such communication can be uni-directional, receive only (for example, broadcast TV), uni-directional send-only (for example CANbusto certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core 740 of the computer system 700.

The core 740 can include one or more Central Processing Units (CPU) 741, Graphics Processing Units (GPU) 742, a graphics adapter 717, specialized programmable processing units in the form of Field Programmable Gate Areas (FPGA) 743, hardware accelerators for certain tasks 744, and so forth. These devices, along with Read-only memory (ROM) 745, Random-access memory 746, internal mass storage such as internal non-user accessible hard drives, SSDs, and the like 747, may be connected through a system bus 748. In some computer systems, the system bus 748 can be accessible in the form of one or more physical plugs to enable extensions by additional CPUs, GPU, and the like. The peripheral devices can be attached either directly to the core's system bus 748, or through a peripheral bus 751. Architectures for a peripheral bus include PCI, USB, and the like.

CPUs 741, GPUs 742, FPGAs 743, and accelerators 744 can execute certain instructions that, in combination, can make up the aforementioned computer code. That computer code can be stored in ROM 745 or RAM 746. Transitional data can be also be stored in RAM 746, whereas permanent data can be stored for example, in the internal mass storage 747. Fast storage and retrieval to any of the memory devices can be enabled through the use of cache memory, that can be closely associated with one or more CPU 741, GPU 742, mass storage 747, ROM 745, RAM 746, and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system 700 having the illustrated architecture, and specifically the core 740 can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core 740 that are of non-transitory nature, such as core-internal mass storage 747 or ROM 745. The software implementing various embodiments of the present disclosure can be stored in such devices and executed by core 740. A computer-readable medium can include one or more memory devices or chips, according to particular needs. The software can cause the core 740 and specifically the processors therein (including CPU, GPU, FPGA, and the like) to execute particular processes or particular parts of particular processes described herein, including defining data structures stored in RAM 746 and modifying such data structures according to the processes defined by the software. In addition or as an alternative, the computer system can provide functionality as a result of logic hardwired or otherwise embodied in a circuit (for example: accelerator 744), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method for building a linear media source extension (MSE) buffer from two or more nonlinear media sources using MPD chaining, the method performed by at least one processor and comprising:
    parsing at least one obtained media presentation segment (MPD) comprising one or more ad media segments, and the one or more ad media segments comprising at least one universal resource locator (URL);
    obtaining a live MPD based on the at least one URL, the live MPD comprising one or more live media segments;
    appending the one or more ad media segments to a first media source extension (MSE) source buffer based on a first timing model, wherein the appending comprises:
        extending the first MSE source buffer to a first maximum duration based on the at least one obtained MPD; and
        setting a timestamp offset of the first MSE source buffer based on a first presentation time offset associated with the one or more ad media segments;
    chaining the one or more live media segments to the one or more ad media segments by appending the one or more live media segments to the first MSE source buffer based on a second timing model, wherein the second timing model supports a time shift buffer depth for at least the one or more live media segments; and
    dispatching the one or more ad media segments and the one or more live media segments based on the first timing model and the second timing model.

2. The method of claim 1, wherein the appending the one or more live media segments to the first MSE source buffer based on the second timing model comprises:
    extending the first MSE source buffer to a second maximum duration based on the one or more live media segments;
    resetting the timestamp offset of the first MSE source buffer based on a second presentation time offset associated with the one or more live media segments; and
    appending a first live media segment among the one or more live media segments to the first MSE source buffer.

3. The method of claim 1, further comprising retrieving one or more codes associated with the at least one obtained MPD and the live MPD.

4. The method of claim 1, further comprising seeking to a start of the one or more live media segments appended in the first MSE source buffer based on a last frame of the one or more ad media segments being played.

5. The method of claim 1, the method further comprising:
    based on the one or more live media segments being encrypted, retrieving one or more license keys from a license server; and
    appending the one or more license keys in a second buffer.

6. The method of claim 1, further comprising purging a first ad media segment among the one or more ad media segments from the first MSE source buffer based on the first ad media segment being configured to be played once.

7. The method of claim 1, further comprising:
    appending a first ad media segment among the one or more ad media segments to a third buffer based on the first ad media segment being configured to be played more than once; and
    appending a first live media segment among the one or more live media segments prior to the first ad media segment based on the first ad media segment being a midroll ad during the first live media segment.

8. The method of claim 2, wherein the second presentation time offset is based on an estimated earliest presentation time associated with the one or more live media segments and a maximum segment duration associated with the one or more live media segments.

9. An apparatus for building a linear media source extension (MSE) buffer from two or more nonlinear media sources using MPD chaining, the apparatus comprising:

at least one memory configured to store computer program code;

at least one processor configured to access the computer program code and operate as instructed by the computer program code, the computer program code including:

parsing code configured to cause the at least one processor to parse at least one obtained media presentation segment (MPD) comprising one or more ad media segments, and the one or more ad media segments comprising at least one universal resource locator (URL);

first obtaining code configured to cause the at least one processor to obtain a live MPD based on the at least one URL, the live MPD comprising one or more live media segments;

first appending code configured to cause the at least one processor to append the one or more ad media segments to a first media source extension (MSE) source buffer based on a first timing model, the first appending code comprising:

first extending code configured to cause the at least one processor to extend the first MSE source buffer to a first maximum duration based on the at least one obtained MPD; and first setting code configured to cause the at least one processor to set a timestamp offset of the first MSE source buffer based on a first presentation time offset associated with the one or more ad media segments;

second appending code configured to cause the at least one processor to chain the one or more live media segments to the one or more ad media segments by appending the one or more live media segments to the first MSE source buffer based on a second timing model, wherein the second timing model supports a time shift buffer depth for at least the one or more live media segments; and dispatching code configured to cause the at least one processor to dispatch the one or more ad media segments and the one or more live media segments based on the first timing model and the second timing model.

10. The apparatus of claim 9, wherein the second appending code comprises:

second extending code configured to cause the at least one processor to extend the first MSE source buffer to a second maximum duration based on the one or more live media segments;

resetting code configured to cause the at least one processor to reset the timestamp offset of the first MSE source buffer based on a second presentation time offset associated with the one or more live media segments; and third appending code configured to cause the at least one processor to append a first live media segment among the one or more live media segments to the first MSE source buffer.

11. The apparatus of claim 9, wherein the program code further includes:

first seeking code configured to cause the at least one processor to seek to a start of the one or more live media segments appended in the first MSE source buffer based on a last frame of the one or more ad media segments being played.

12. The apparatus of claim 9, wherein the program code further includes:

retrieving code configured to cause the at least one processor to retrieve one or more license keys from a license server based on the one or more live media segments being encrypted; and fourth appending code configured to cause the at least one processor to append the one or more license keys in a second buffer.

13. The apparatus of claim 9, wherein the program code further includes:

first purging code configured to cause the at least one processor to purge a first ad media segment among the one or more ad media segments from the first MSE source buffer based on the first ad media segment being configured to be played once.

14. The apparatus of claim 9, wherein the program code further includes:

fifth appending code configured to cause the at least one processor to append a first ad media segment among the one or more ad media segments to a third buffer based on the first ad media segment being configured to be played more than once; and sixth appending code configured to cause the at least one processor to append a first live media segment among the one or more live media segments prior to the first ad media segment based on the first ad media segment being a midroll ad during the first live media segment.

15. The apparatus of claim 10, wherein the second presentation time offset is based on an estimated earliest presentation time associated with the one or more live media segments and a maximum segment duration associated with the one or more live media segments.

16. A non-transitory computer-readable medium storing instructions, the instructions comprising: one or more instructions that, when executed by one or more processors of a device for building a linear media source extension (MSE) buffer from two or more nonlinear media sources using MPD chaining, cause the one or more processors to:

parse at least one obtained media presentation segment (MPD) comprising one or more ad media segments, and the one or more ad media segments comprising at least one universal resource locator (URL);

obtain a live MPD based on the at least one URL, the live MPD comprising one or more live media segments;

append the one or more ad media segments to a first media source extension (MSE) source buffer based on a first timing model, wherein the appending comprises:

extending the first MSE source buffer to a first maximum duration based on the at least one obtained MPD; and setting a timestamp offset of the first MSE source buffer based on a first presentation time offset associated with the one or more ad media segments;

chain the one or more live media segments to the one or more ad media segments by appending the one or more live media segments to the first MSE source buffer based on a second timing model, wherein the second timing model supports a time shift buffer depth for at least the one or more live media segments; and dispatch the one or more ad media segments and the one or more live media segments based on the first timing model and the second timing model.

17. The non-transitory computer-readable medium of claim 16, wherein the appending the one or more live media segments to the first MSE source buffer based on the first timing model comprises:

extending the first MSE source buffer to a second maximum duration based on the one or more live media segments;

resetting the timestamp offset of the first MSE source buffer based on a second presentation time offset associated with the one or more live media segments; and appending a first live media segment among the one or more live media segments to the first MSE source buffer.

* * * * *